(12) United States Patent
Apostolopoulos et al.

(10) Patent No.: US 7,581,094 B1
(45) Date of Patent: *Aug. 25, 2009

(54) CRYPTOGRAPHIC CHECKSUMS ENABLING DATA MANIPULATION AND TRANSCODING

(75) Inventors: John Apostolopoulos, Palo Alto, CA (US); Susie Wee, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 882 days.

This patent is subject to a terminal disclaimer.

(21) Appl. No.: 10/616,680

(22) Filed: Jul. 9, 2003

(51) Int. Cl.
*H04L 9/00* (2006.01)

(52) U.S. Cl. ...................................... 713/160

(58) Field of Classification Search ........................ None
See application file for complete search history.

(56) References Cited

U.S. PATENT DOCUMENTS

| | | | | |
|---|---|---|---|---|
| 6,963,972 B1* | 11/2005 | Chang et al. | ................. | 713/153 |
| 2002/0174332 A1* | 11/2002 | Vialen et al. | ................. | 713/152 |
| 2003/0103571 A1* | 6/2003 | Meehan et al. | ......... | 375/240.27 |
| 2004/0196975 A1* | 10/2004 | Zhu et al. | .................. | 380/258 |

OTHER PUBLICATIONS

Definition of Cryptographic Checksum, http://searchsecurity.techtarget.com/sDefinition/0,,sid14_gci869866,00.html, updated on Dec. 23, 2002, accessed on Jun. 15, 2008.*

* cited by examiner

*Primary Examiner*—Brandon S Hoffman (57) ABSTRACT

Disclosed are methods and systems for providing security to manipulation of streamed data in a network, which comprise separating an amount of streamed data into segments, computing a cryptographic checksum for a segment, and combining a segment of data and an associated cryptographic checksum into a data packet.

41 Claims, 12 Drawing Sheets

CRYPTOGRAPHIC CHECKSUMS ENABLING DATA MANIPULATION AND TRANSCODING

FIELD OF THE INVENTION

The present invention relates to the field of data manipulation in media streaming and storage. More specifically, the present claimed invention relates to security during the transcoding or processing of data.

BACKGROUND ART

Streaming media environments present many challenges for the system designer. For instance, clients can have different display, power, communication, and computational capabilities. In addition, communication links can have different maximum bandwidths, quality levels, and time-varying characteristics. A successful video streaming system must be able to stream video to different types of clients over time-varying communication links, and this streaming must be performed in a scalable and secure manner. Scalability is needed to enable streaming to a multitude of clients with different device capabilities and security is important, particularly in wireless networks, to protect content from eavesdroppers.

In order to achieve scalability and efficiency in wireless streaming environments, it is necessary to adapt, or transcode, the compressed video stream at intermediate network nodes. A transcoder takes a compressed video stream as the input, then processes it to produce another compressed video stream as the output. Exemplary transcoding operations include bit rate reduction, rate shaping, spatial down-sampling, frame rate reduction, and changing compression formats. Network transcoding can improve system scalability and efficiency, for example, by adapting the spatial resolution of a video stream for a particular client's display capabilities or by dynamically adjusting the bit rate of a video stream to match a wireless channel's time-varying characteristics.

By way of example, a streaming media video clip may be part of a presentation of a web page. Large and powerful desktop receivers on a large bandwidth connection may receive and decrypt a full resolution, full frame rate, video stream of high-definition television (HDTV) for instance. However, a wireless adjunct to the same network may only be able to connect wireless users at a much smaller bandwidth. The stream must be converted to a smaller bandwidth signal in order to be carried. The conversion is called transcoding.

While network transcoding facilitates scalability in video streaming systems, it also poses a serious threat to the security of the streaming system. This is because conventional transcoding operations performed on encrypted streams generally require decrypting the stream, transcoding the decrypted stream, and then re-encrypting the result. Specifically, the transcoder requires the encryption key and the content is decrypted, and in plain form, at the transcoder. Because every transcoder must decrypt the stream, each network transcoding node presents a possible breach in the security of the entire system.

Furthermore, there may be strategically placed nodes I network that are ideally located for performing transcoding but cannot be trusted. These untrusted nodes may be individual computers, client intranets at remote locations, or any other node that is interposed between an original sender and an intended receiver.

More specifically, in conventional video streaming approaches, for example, employing application-level encryption, video is first encoded, or compressed, into a bitstream using inter-frame compression algorithms. The resulting bitstream can then be encrypted, and the resulting encrypted stream is packetized and transmitted over the network using a transport protocol such as unreliable datagram protocol (UDP).

It is noted here that, in this discussion of background, the use of the terms "encode, decode, encoding, decoding, encoded, decoded," etc. refer to the compression or other encoding of data into forms suitable for transport over network carriers, whether those carriers are cable, optical fiber, wireless carrier or other network connection. "Encrypt, decrypt, encrypting, decrypting, encryption, decryption," etc. refer to cryptographic encoding that is used to protect the security of data from unauthorized recipients or to verify that the data received is exactly what was originally sent.

Figure 1A:
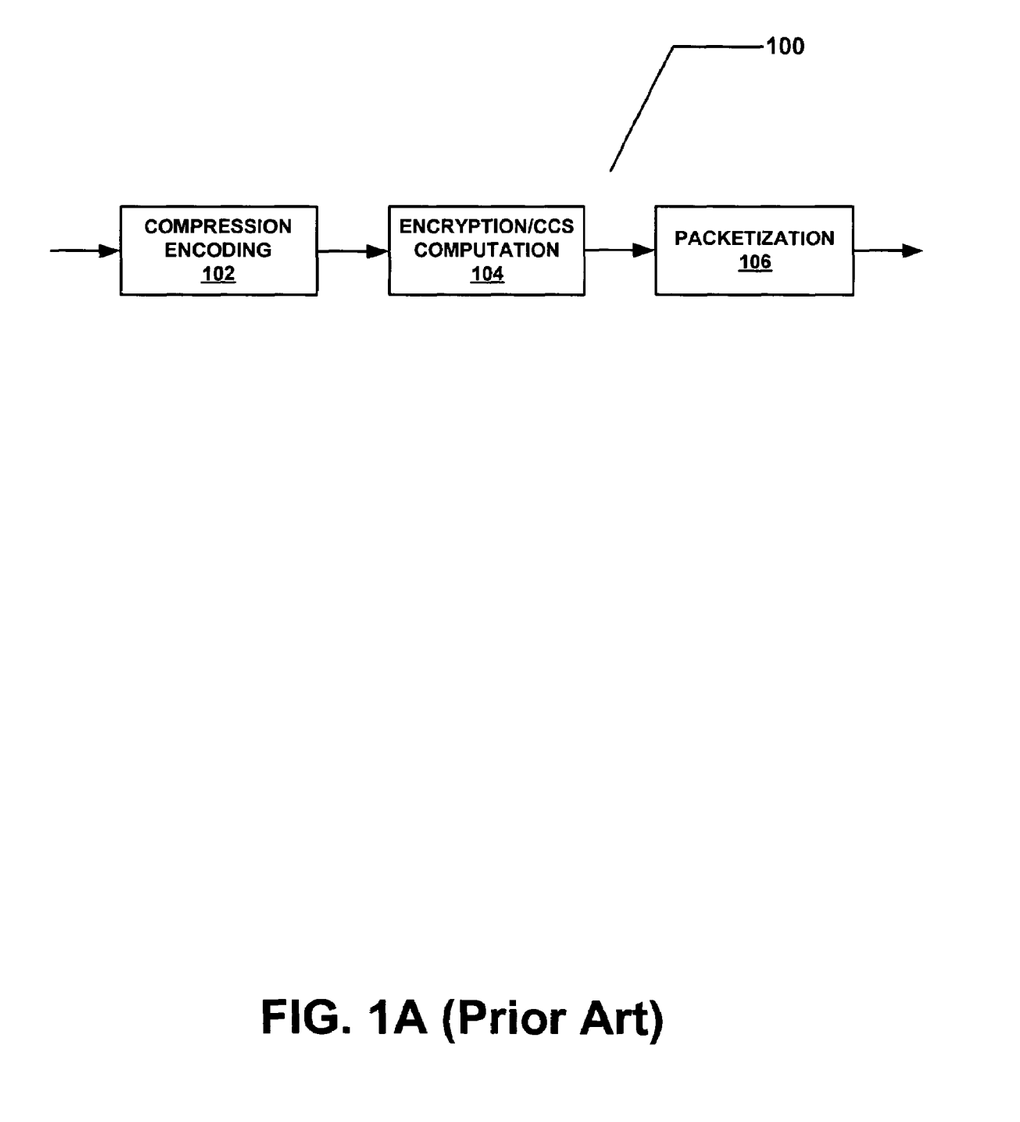
FIG. 1A (Prior Art) is a block diagram which illustrates the order in which conventional application-level encryption is performed.

Prior art FIG. 1A is a block diagram, 100, which illustrates the order in which conventional application-level encryption is performed (i.e. Compression Encoding, 102, Encryption/Checksum Computation, 104 and Packetization, 106). One difficulty with this conventional approach arises when a packet is lost. Specifically, error recovery is difficult because without the data from the lost packet, decryption and/or decoding may be difficult if not impossible.

Figure 1B:
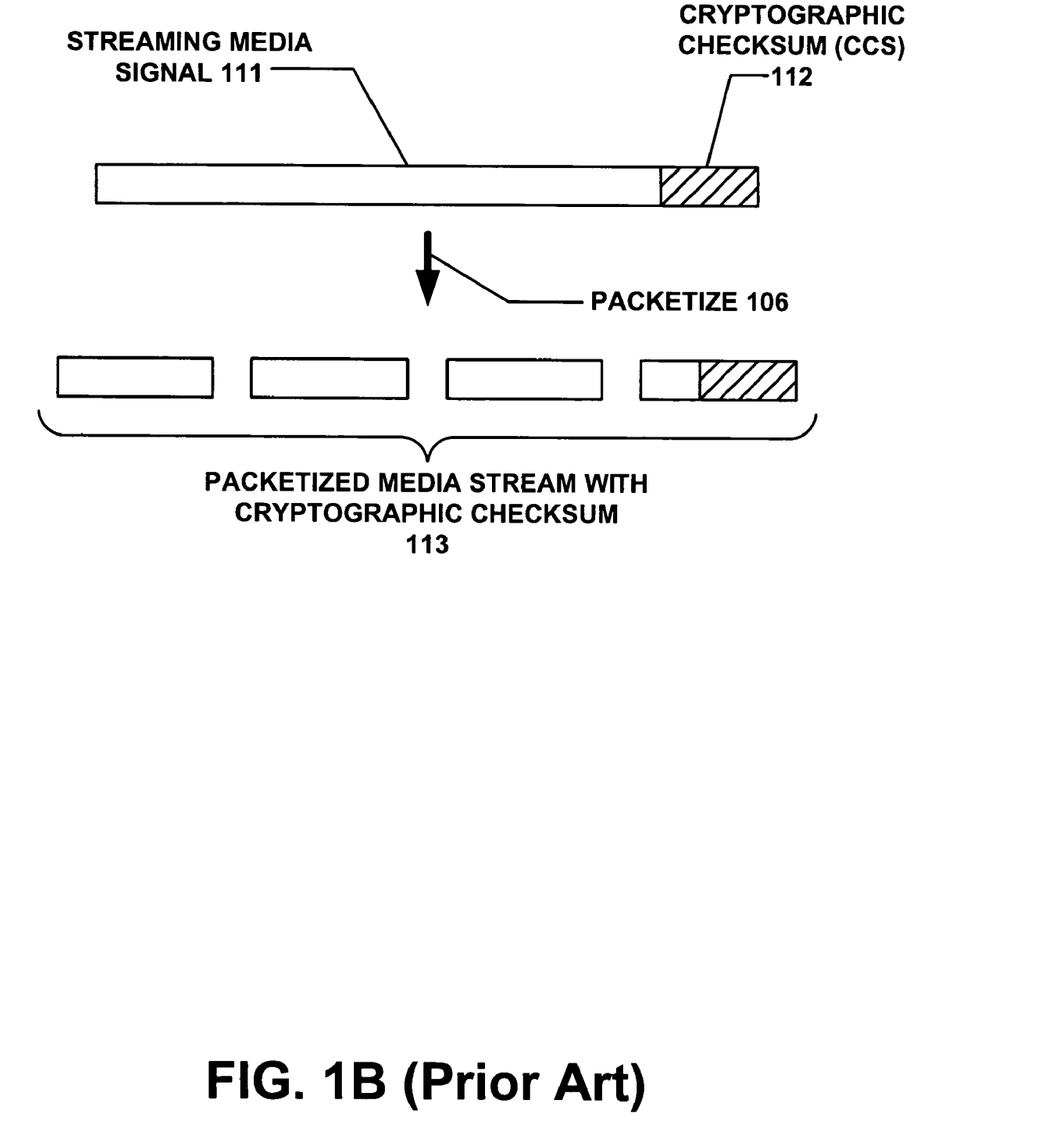
FIG. 1B (Prior Art) is a block diagram which illustrates the transmitted result of conventional application-level encryption.

Prior art FIG. 1B illustrates the resultant packetized media stream as produced by process 100 of FIG. 1A. Media stream 111 is compressed by compression encoding function 102, encrypted and cryptographic checksum (CCS) 112 is appended by Encryption/CCS function 104. Packetization, 106, separates the signal, consisting of the media stream data and CCS, into packets of the network's required size, 113. All of the packets must be reassembled into the encrypted media stream in order to decrypt the data, or verify it if it is unencrypted. If one of the packets, 113, is lost, then the entire message is lost due to the invalidity of the CCS without the missing packet.

It is noted here that encryption and CCS computation are related but not the same operation. A CCS can be computed and appended to an unencrypted media stream and the CCS can be used to verify the integrity and authenticity of the stream at the receiver.

Figure 1C:
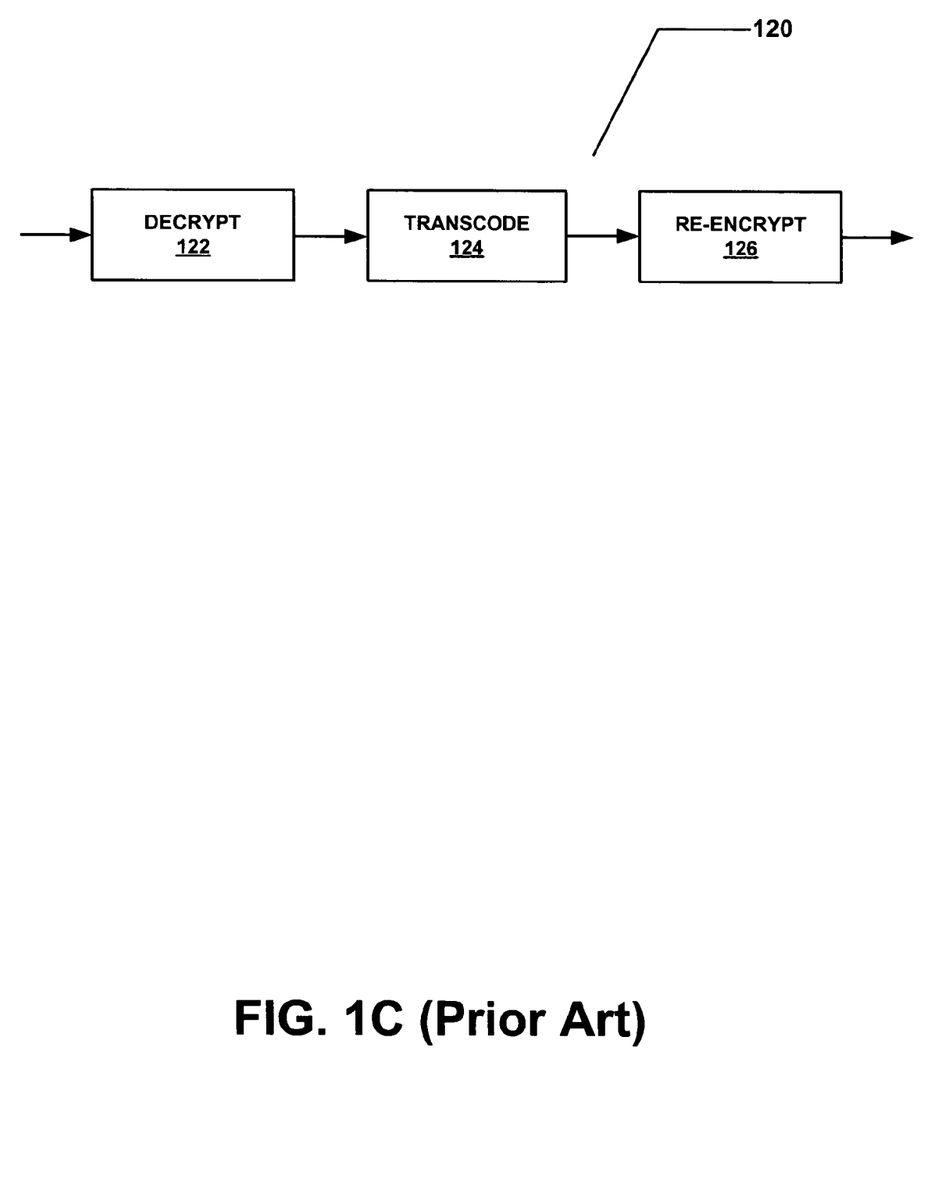
FIG. 1C (Prior Art) is a block diagram which illustrates another conventional secure streaming system using network-level encryption.

Prior art FIG. 1C illustrates a functional block diagram of a transcoding process in which encrypted data must be transcoded for reasons discussed previously. In process 120, the media stream is decrypted at 122, transcoded at 124, then re-encrypted at 126. During the period in which the data is unencrypted, it is accessible to unauthorized reading or manipulation at an insecure or untrusted node.

In hybrid wired/wireless networks, it is often necessary to simultaneously stream media to fixed clients on a wired network and to mobile clients on a wireless network. In such a hybrid system, it may often be desirable to send a full-bandwidth, high-resolution media stream to the fixed, wired, client, and a lower-bandwidth, medium-resolution media stream to the mobile wireless receiver. Conventional media streaming approaches, however, do not achieve the efficiency, security, and scalability necessary to readily accommodate the streaming corresponding to hybrid wired/wireless networks.

Although the above-listed discussion specifically mentions the shortcomings of prior art approaches with respect to the streaming data, such shortcomings are not limited solely to the streaming of video data. Instead, the problems of the prior art span various types of media including, but not limited to, audio-based data, speech-based data, image-based data, graphic data, web page-based data, and the like.

Accordingly, what is needed is a method and/or system that can enable a potentially untrusted transcoder in the middle of a network to transcode a media stream while still preserving the end-to-end security of the rest of the stream. Specifically, what is needed is a means for computing and performing the cryptographic checksum that allows a potentially untrusted transcoder to perform the transcoding in an appropriate manner, yet still allowing the intended receiver to validate the integrity of the transmitted data and allowing any encryption of the transmitted data to remain uncompromised.

SUMMARY OF THE INVENTION

Embodiments of the present invention pertain to methods and systems for providing security to manipulation of streamed data in a network, which comprise separating an amount of streamed data into segments, computing a cryptographic checksum for a segment, and combining a segment of data and an associated cryptographic checksum into a data packet.

BRIEF DESCRIPTION OF THE DRAWINGS

The operation of this invention can be best visualized by reference to the drawings.

DETAILED DESCRIPTION

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

Presented herein is a method to create and apply a cryptographic checksum for streaming of media over networks. The goal of the cryptographic checksum (CCS) is to validate the integrity of the sent data, for example to verify that it has not been altered by others. In one embodiment, the presentation of the present invention is in the context of secure scalable streaming (SSS) to enable a potentially untrusted transcoder to transcode a media stream while still preserving the desired end-to-end security of the media stream. Specifically, disclosed herein is a method and system for designing and performing the cryptographic checksum such that as long as the potentially untrusted transcoder performs the transcoding in the appropriate manner, the receiver is still able to validate the integrity of the sent data.

Secure transcoding is necessary because a potentially untrusted transcoder cannot be counted on to add a proper cryptographic checksum after its transcoding. Instead, embodiments of the present invention are designed so that the sender has already included the checksum for possible transcoded bitstreams.

Figure 2:
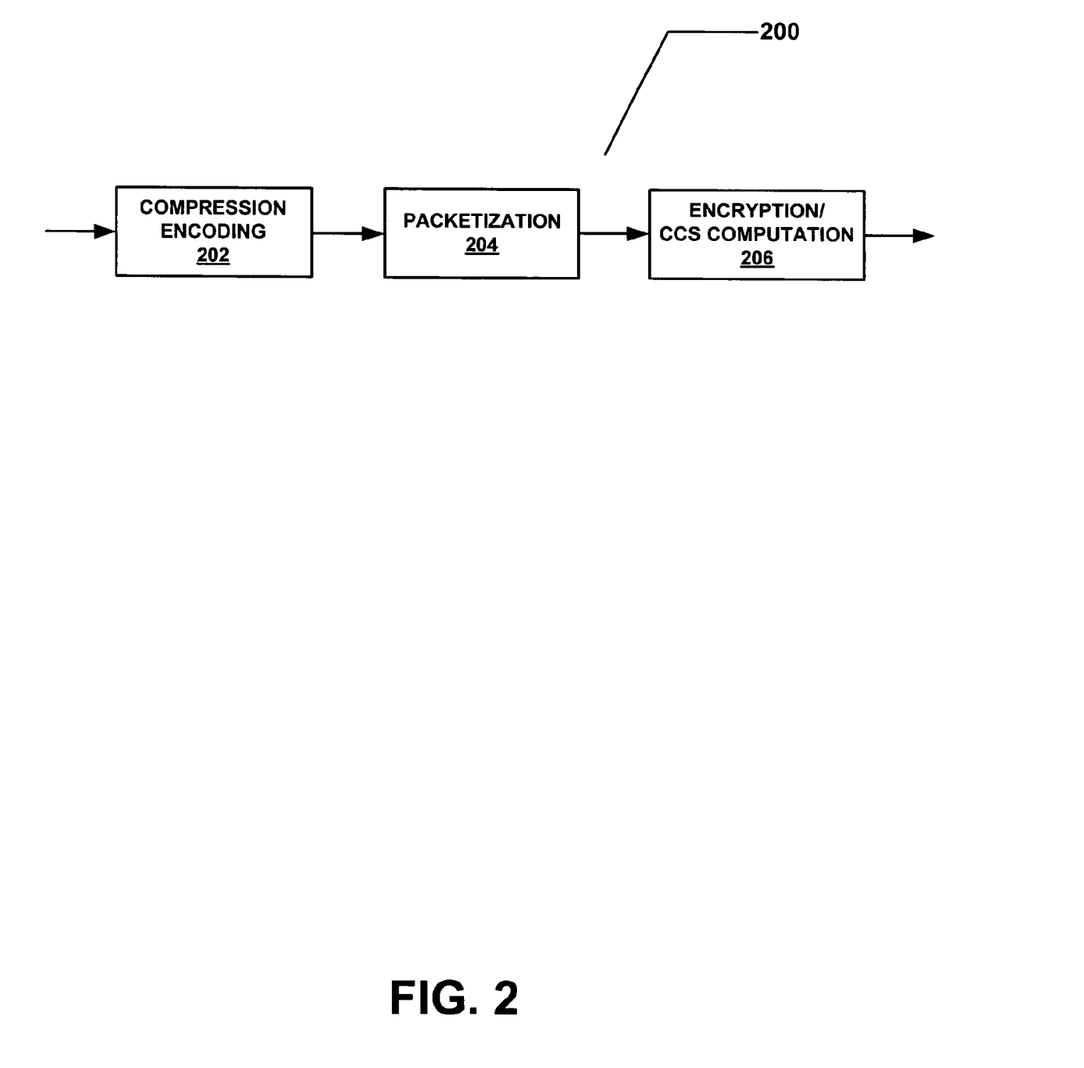
FIG. 2 is a block diagram which illustrates a packetization and encryption method in accordance with embodiments of the present invention.

FIG. 2 illustrates one embodiment of the present invention. FIG. 2 is a block diagram 200 illustrating a method of achieving a secure media streaming system that offers a means of overcoming the aforementioned shortcomings. Process 200 incorporates compression/encoding function 202, packetization 204, and encryption/CCS computation 206. In this process, packetization for transmission takes place before encryption/CCS computation 206. The method of FIG. 2 can use any of the conventional compression algorithms. Here, the media stream is encoded before checksum computation 206 computes a cryptographic checksum for each data packet.

Figure 3:
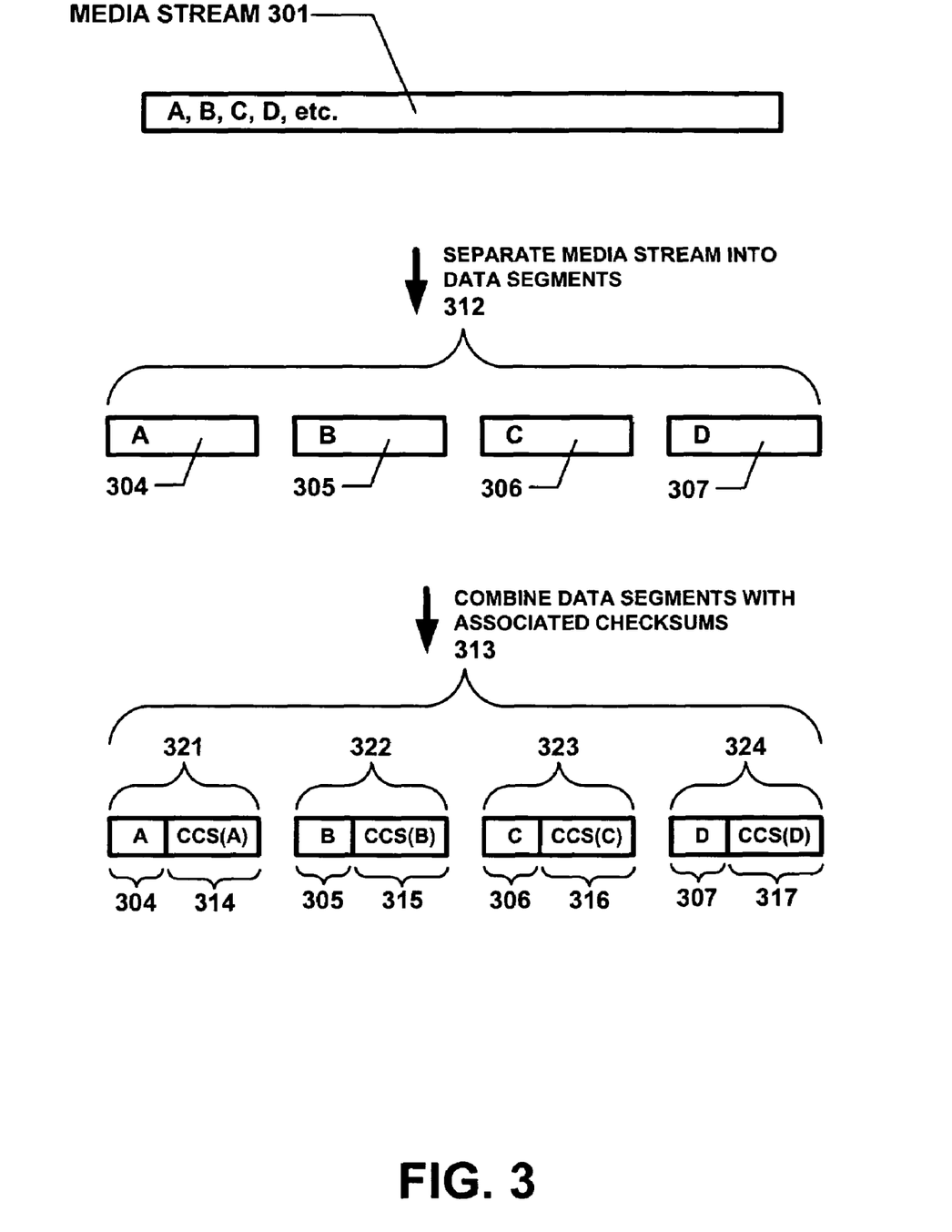
FIG. 3 illustrates the encoded, packetized and encrypted media stream in accordance with embodiments of the present invention.

FIG. 3 illustrates a result of an embodiment of process 200 where media stream 301 is separated, at 312, into segments 304, 305, 306 and 307. Each segment, in this example, includes at least one independently decodable part. In the example shown in FIG. 3, the independently decodable parts are labeled A, B, C and D with each segment including only one independently decodable part. It is noted here that other embodiments can include more than one independently decodable part in a segment. A cryptographic checksum is computed for each segment 304, 305, 306 and 307. At 313, after cryptographic checksum computation, each segment 304, 305, 306 and 307 and its respective cryptographic checksum 314, 315, 316 and 317 is combined into a data packet 321, 322, 323 and 324. For example, segment A, 304, and its associated checksum, CCS(A), 314, are combined to form data packet 321. Segment B, 305, and its associated checksum, CCS(B), 315, are combined to form data packet 322.

It is noted here that the length of each segment, in embodiments of the present invention, is chosen so that its length plus that of its associated CCS is less than the maximum packet payload size or the maximum transmittable unit (MTU) for the network. As discussed earlier, a data segment may comprise a single truncatable unit or a plurality of truncatable units. It is noted also that, though there are four packets illustrated, any number of packets can be used.

It is noted here that the terms "independently decodable part" and "truncatable unit" can have different meanings in the embodiments of the present invention discussed here. An independently decodable part of a packet is a portion of the packet's payload that can be decoded without the necessity of decoding other portions of the packet payload. Further, if encrypted, the independently decodable part can be decrypted without decryption of the remainder of the payload. A truncatable unit is a portion of a packet payload that can be truncated from the packet, with or without decryption, without detrimental effect on the remainder of the packet. At times in this discussion, the terms are used somewhat interchangeably but still maintain their separate meanings.

Figure 4A:
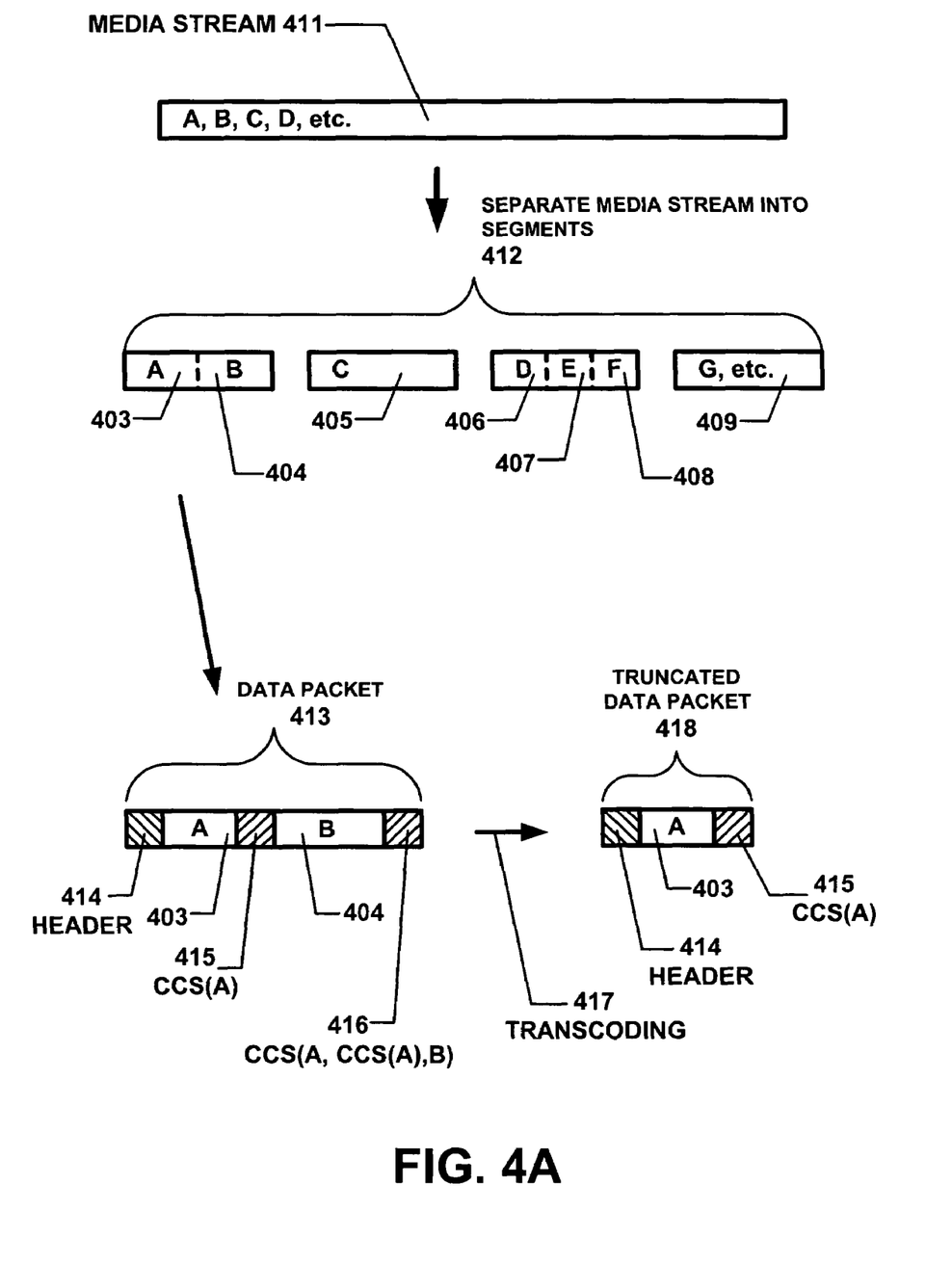
FIG. 4A illustrates an encoded digital stream with independently computed cryptographic checksums in accordance with embodiments of the present invention.

FIG. 4A illustrates the functionality of an embodiment of the present invention in which transcoding can occur by truncation. Media stream 411 is separated, at 412, into segments, each comprising one or more independently decodable parts (A, B, etc). It is noted again that a packet payload can comprise one or more independently decodable parts and, in some embodiments, the independently decodable parts can comprise independently truncatable units. As shown at packet 413, a cryptographic checksum is computed for each of the decodable parts or truncatable units, in order of priority. Cryptographic checksum 415 is computed for the first truncatable unit A, 403, resulting in CCS(A) 415. Cryptographic checksum 416 is computed for the entire preceding packet payload which comprises independently decodable part A, 403, cryptographic checksum CCS(A), 415, and independently decodable part B, 404. The resulting checksum is shown as CCS(A,CCS(A),B), 416. It is noted that, if a third independently decodable part were included, the next cryptographic checksum would be designated as:

CCS(A,CCS(A),B,CCS(A,CCS(A),B),C).

A transcoder-readable header, 414, is applied to the packet 413. The transcoder readable header contains information such as the truncation points in the packet.

When transcoding, 417, occurs in this embodiment, the transcoder can truncate selected truncatable units. If the packet is encrypted, decryption is not required in order to accomplish this form of transcoding. In the example illustrated in FIG. 4A, truncatable unit B and its associated cryptographic checksum, 416, are truncated. The untruncated, and undecrypted, remainder of the packet, 418, is then forwarded with its necessary cryptographic checksum, CCS(A) 415, independently decodable part A 403, and header 414, intact. In the embodiment of the present invention illustrated in FIG. 4A, any number of truncatable units and their associated cryptographic checksum can be truncated from a packet as necessary for transcoding requirements. In each case, the truncatable unit, its associated cryptographic checksum and subsequent truncatable units whose cryptographic checksums include calculation for the truncated units are also truncated.

Figure 4B:
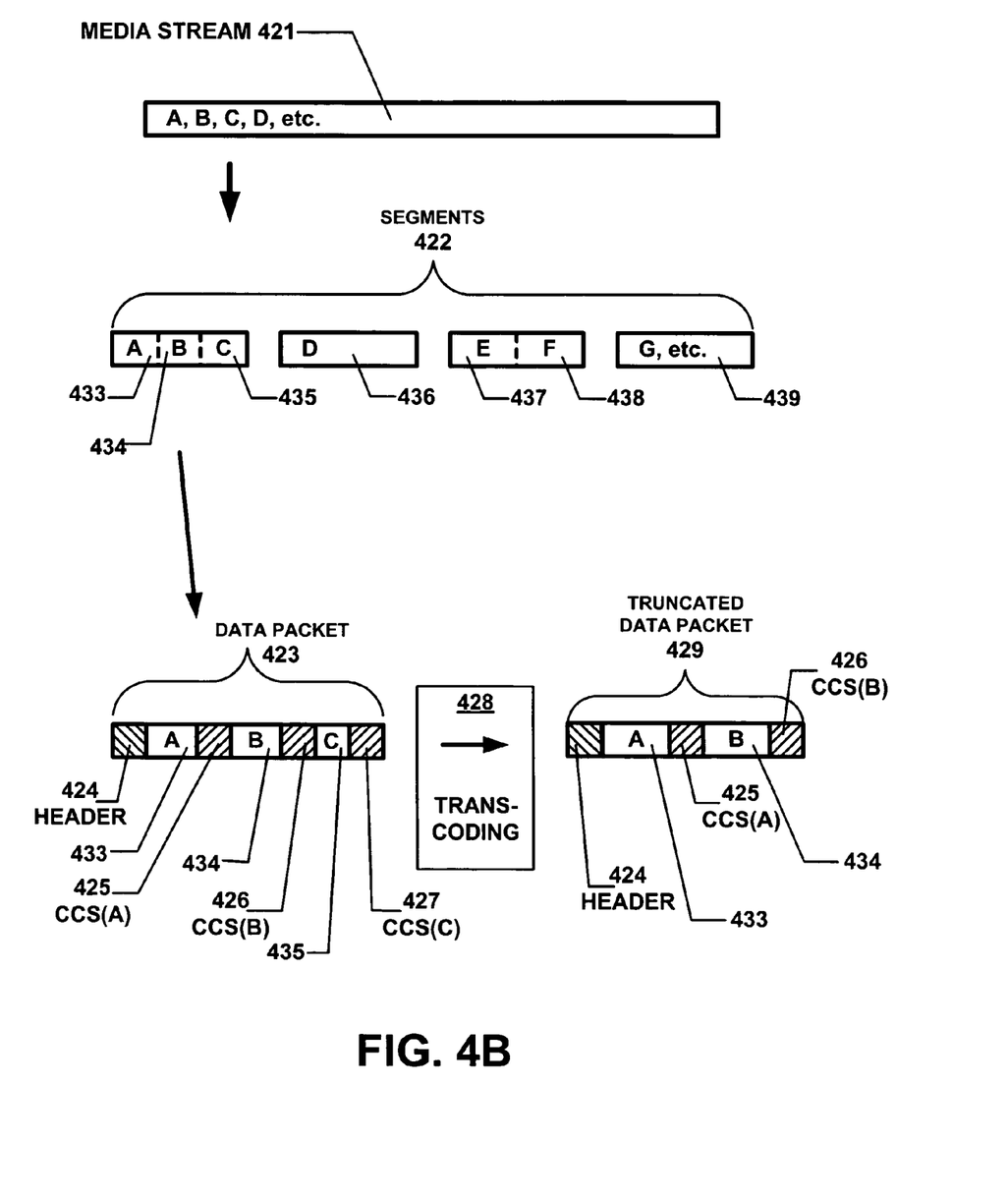
FIG. 4B illustrates an encoded digital stream with independently computed cryptographic checksums in accordance with embodiments of the present invention.

FIG. 4B illustrates another embodiment of the present invention. Here, media stream 421 is separated at 422 into segments which, as discussed above, may comprise any number of independently decodable parts, shown as A, B, C, D, etc. It is noted that, in this example, some segments comprise more independently decodable parts than others because of the size of each part. The selection of the number of independently decodable parts is, in this embodiment of the present invention, predicated on the maximum size of the data packet. For example independently decodable parts A, 433, B, 434, and C, 435, are combined in one segment while independently decodable part D, 436, occupies a similarly-sized segment by itself.

In the embodiment illustrated in FIG. 4B, a cryptographic checksum is calculated for each independently decodable part, independently of other independently decodable parts. Data packet 423 is formed of the combination of independently decodable part A, 433, and CCS(A), 425, independently decodable part B, 434, and CCS(B), 426, and independently decodable part C, 435, and CCS(C), 427.

Transcoding, 428, of packet 423 then involves truncating the selected independently decodable parts, or truncatable units, and associated cryptographic checksums. In the example shown, truncatable unit C, 435, and CCS(C), 427, are truncated. In this embodiment, transcoder-readable header 424 remains intact and retains its information regarding truncation points. Truncated packet 429, therefore, is available to be transcoded by truncation subsequently by truncating truncatable unit B and CCS(B), 426. In this fashion, transcoding can occur at any desired point in a network without any packet having to be decrypted and re-encrypted to achieve the transcoding. At each truncation, the remainder of the packet, undecrypted, retains its necessary cryptographic checksums and the streamed media retains its end-to-end security.

It is noted here that, in some embodiments, transcoding can occur by deleting entire packets from the media stream. It is also noted that cryptographic checksums can also be used in unencrypted media streams, such as for packet verification.

Figure 5A:
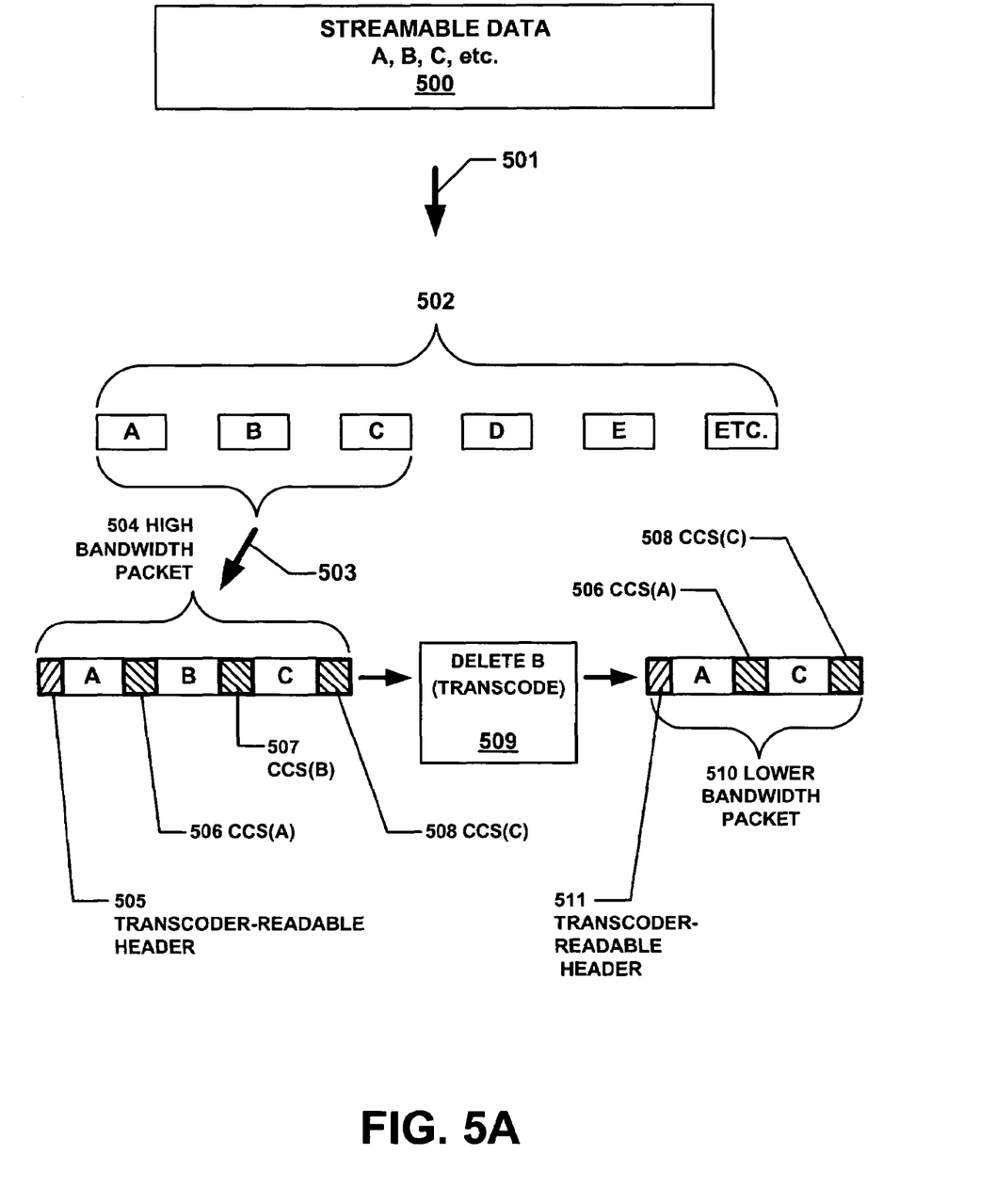
FIG. 5A illustrates an encoded data stream with independently computed cryptographic checksums appended in accordance with embodiments of the present invention.

FIG. 5A illustrates a result of the processes incurred by the embodiments of the present invention. Media stream 500, comprising data illustrated as "A, B, C, etc." is separated, 501, into truncatable units, 502. Each packet payload, in a secure media stream, is encrypted, 503, and appended with an independent cryptographic checksum (CCS), illustrated as CCS(A), 506, CCS(B), 507, and CCS(C), 508. The encrypted truncatable units, with the associated cryptographic checksums, are combined into appropriate length transmittable data packets, as shown at 504.

It is noted here that cryptographic checksums may be of many different functions. A common checksum can involve a well-known hash function, which provides a fingerprint of the data contained in an encrypted data packet and can guarantee the authenticity of received data and the validity of decrypted data. Other examples of checksum functions that can be used to provide cryptographic checksum capability include Message Authentication Codes (MAC), keyed hashes such as MD4 & MD5 (Message Digest algorithms), SHA (Secure Hash Algorithm), RIPEMD (RACE Integrity Primitives Evaluation Message Digest), and HMAC (keyed-Hashing for Message Authentication). Also, in some implementations, digital signature schemes may also be used.

In another embodiment of the present invention, the separation of data segments into truncatable units is referred to as secure scalable streaming (SSS). Using techniques such as SSS, the truncatable units are packetized. Each data packet can be transcoded by truncating the packet at appropriate truncation points which may be defined in a header included in the packet. For example, during transcoding, bit rate reduction, frame rate reduction, or the like is achieved by truncating, or eliminating, one or more truncatable units from the packet.

In this embodiment of the present invention, a transcoder-readable header, 505, is written and applied to the transmittable packet. As discussed in reference to FIG. 5A, above, the transcoder-readable header comprises information relating to the packet payloads within the packet but does not disclose the contents of the packet payloads. By reading the transcoder-readable header, the transcoder can delete portions, 509, or "scale down" a transmittable packet without decrypting either the deleted part or the remainder of the packet, as illustrated at 510. In the example shown, independently decodable part B with its associated cryptographic checksum, is deleted with no effect on independently decodable parts A or C or their associated cryptographic checksums. In this fashion, end-to-end security of the streamed media data is maintained without hindering the transcoding function, and the receiver can validate the integrity of the transcoded data.

Figure 5B:
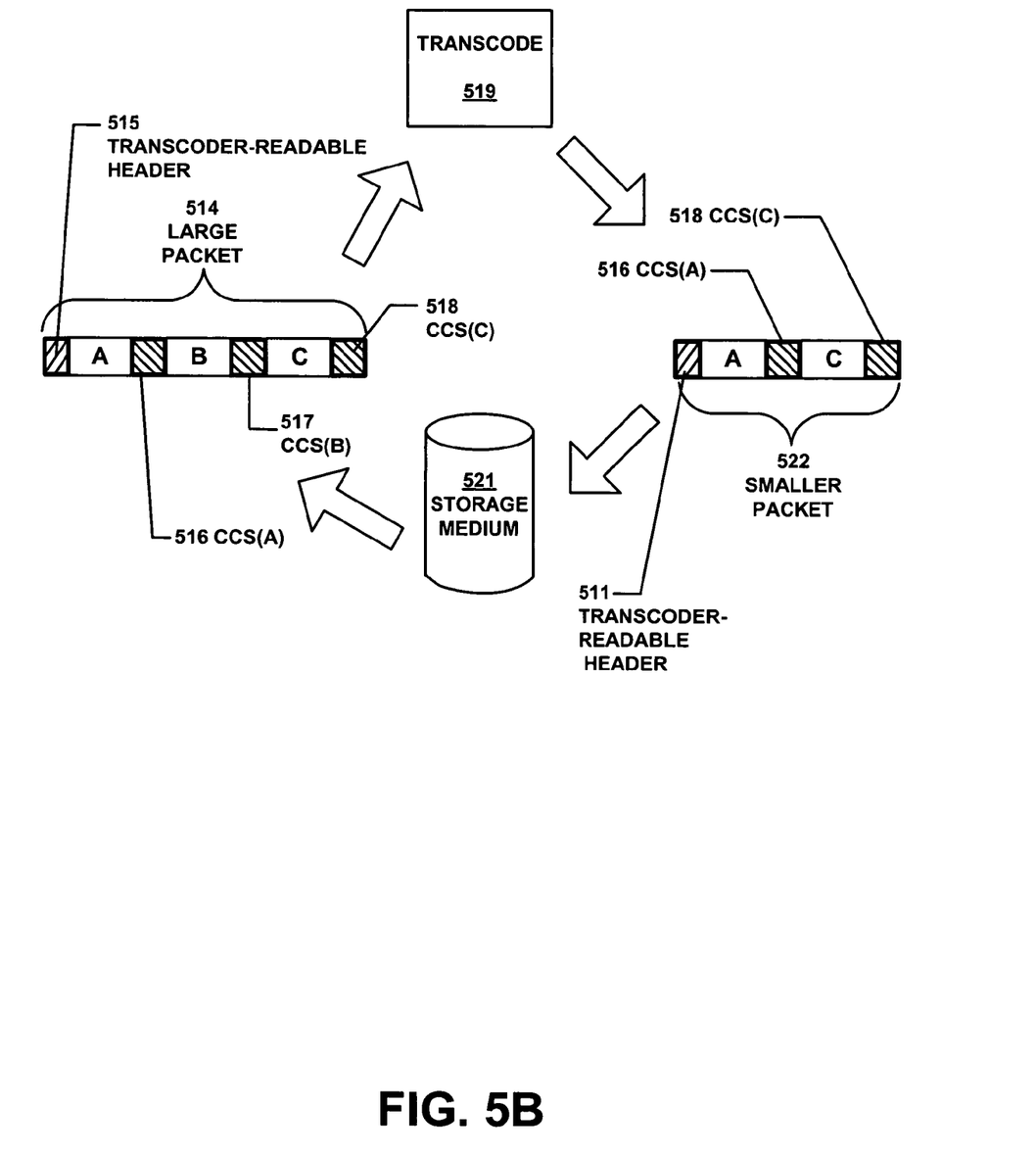
FIG. 5B illustrates encoded digital data packets with independently computed cryptographic checksums appended in accordance with embodiments of the present invention being transcoded and stored.

In the embodiments illustrated in FIGS. 5A and 5B, after transcoding occurs, a new transcoder-readable header, 511, may be written to reflect the content of the new data packet, 510. As in the previous transcoder-readable header, information about the start and end points of the included packet payloads and the payload priority is included but information disclosing the contents is not. Indeed, because the new transcoder-readable header is written by a transcoder which does not have the key with which to decrypt the packet payloads or to evaluate the CCSs, the new transcoder-readable header is not capable of disclosing packet payload contents.

With a new transcoder-readable header, possible further transcoding and scaling is able to take place at another location downstream in the communication. In addition to packet payload size and location, packet payload priority is included in the transcoder-readable header and other priority information can be included, such as information from a web page that is considered discardable by web page owner. In the case of transmission to a handheld device with a lower display capability than a large desktop computer, much of the information in some complex web pages is lost even if it is attempted to be displayed. By making this lower priority information removable in early transcoding, valuable bandwidth can be preserved for other uses when transmitting to these smaller devices.

Embodiments of the present invention are enabled to process data packets that are not streamed. FIG. 5B illustrates, in block format, the process of another embodiment. Here, stored data is manipulated without disturbing the cryptographic checksums. Large data packet 514, comprising segments A, B, & C, is taken from storage medium 521. In the example of FIG. 5B, data is in essence compressed to reduce storage space. This is accomplished by the removal of a segment of data, in this case segment B, and its associated CCS, 517, by transcoding, 519. The result of transcoding is the smaller data packet 522. It is noted that transcoding in this manner leaves segments A and C intact and, significantly, CCS(A) 516 and CCS(C) 518, are undisturbed. If necessary to later operations, transcoder-readable header 515 can be replaced by new transcoder readable header 511.

It is noted that the transcoding schemes provided by embodiments of the present invention are not limited to streamed data but can also be used in stored data. Additionally, the transcoding techniques are useful for unencrypted data as well as encrypted data. In either case, transcoding can occur without disruption of the cryptographic checksums and without having to read the encoded data.

Figure 6:
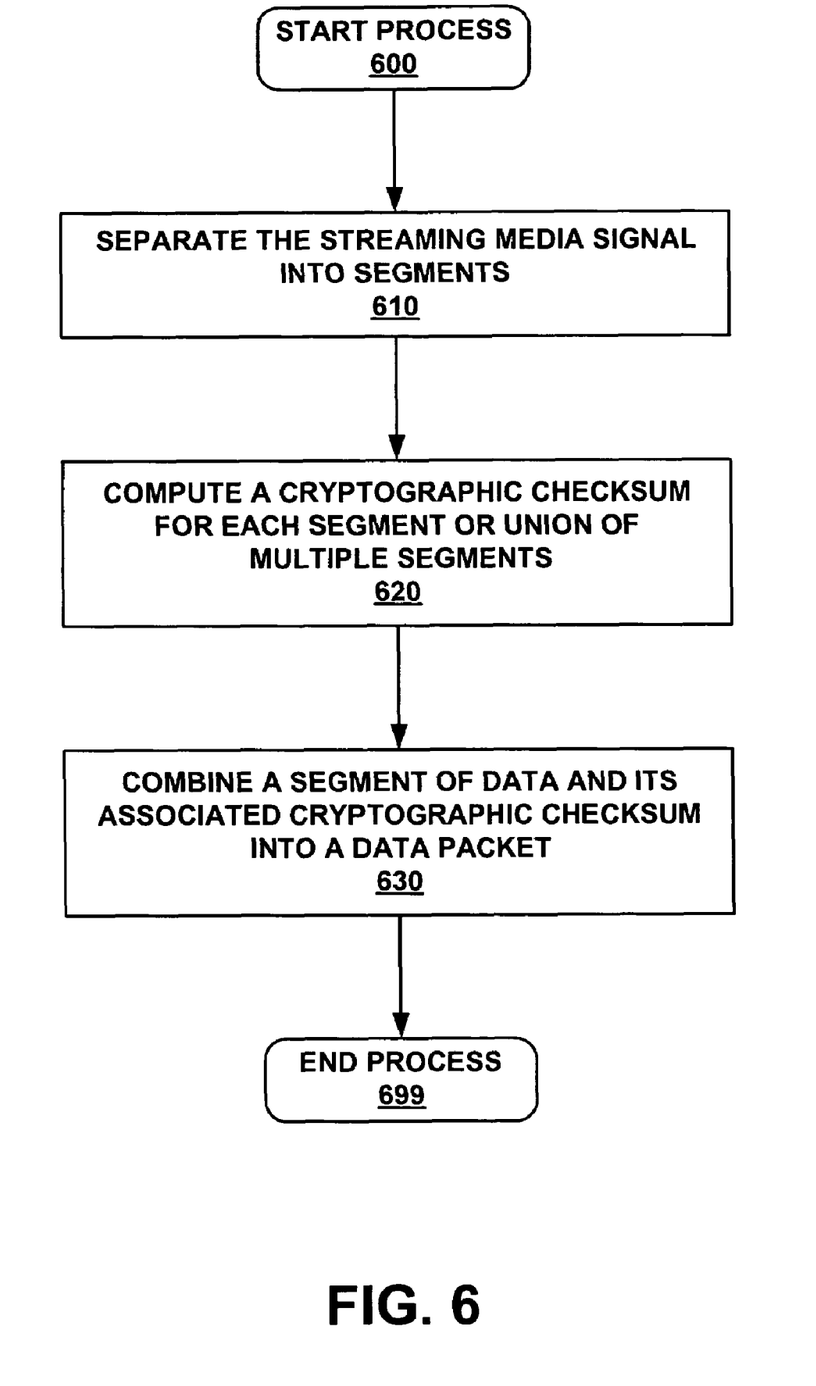
FIG. 6 illustrates a block diagram illustrating a method in accordance with embodiments of the present invention.

One embodiment of a process by which this is accomplished is illustrated in FIG. 6. Process 600 begins by separating the media signal to be streamed into segments at 610. The segments may be any appropriate division that allows one or more of the segments and their associated cryptographic checksums, to fit into a communication packet. An example of appropriately separated independently decodable parts can be parts of highly detailed compressed images, such as can be transmitted with the compression standard developed by the Joint Picture Expert Group (JPEG), for example JPEG-2000. In many instances, the first data transmitted contains data sufficient to produce a highly pixilated image. Subsequent data in the stream then successively refines the image detail. The presentation of such an image on a large display can make use of the enhanced detail. However, the display on a handheld computer may show no difference between the image after the first refinement and after the last and most highly detailed refinement. A logical transcode can remove the more highly detailed data from the stream if the receiver is unable to use the detail. In some instances of transmitted data, a single packet may contain data comprising several levels of detail. However, some larger images may have many packets required to carry all the requisite data.

Once separated, a cryptographic checksum is computed for each segment, or union of multiple segments, at 620. At 630, the segments and their associated cryptographic checksums are combined into appropriately sized data packets for transmission in the network.

Figure 7:
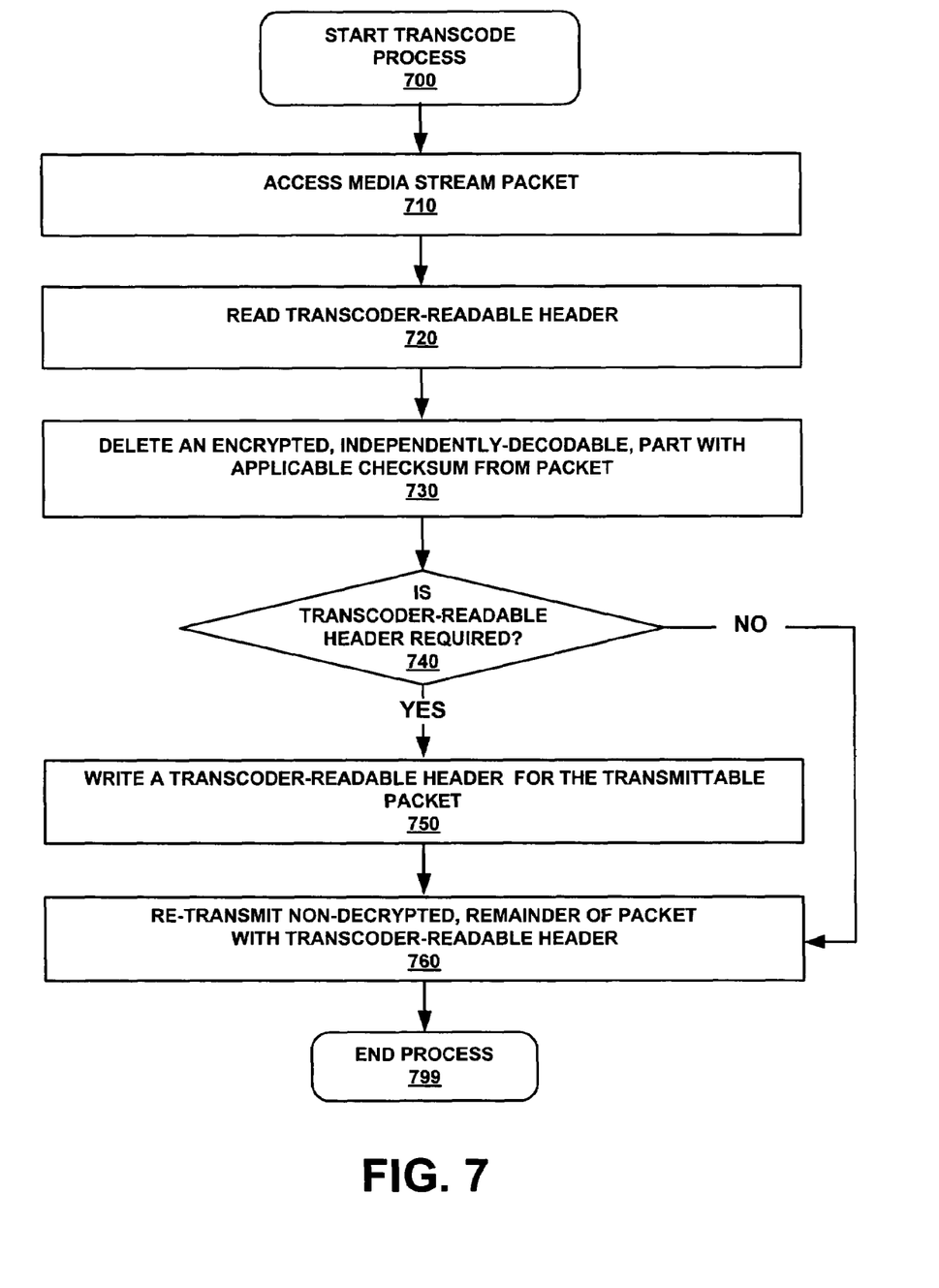
FIG. 7 illustrates a transcoding method in accordance with embodiments of the present invention.

FIG. 7 illustrates the ensuing action by a transcoder in this embodiment. When a transcoder, operating at a potentially untrusted node, is required for transcoding the media stream, whether to reduce required bandwidth or to accommodate the limitations of an intended receiver or for any other reason, the media stream is accessed at 710 and the transcoder-readable header is read at 720. The transcoder-readable header contains information salient to the contents of the of the packet, such as truncation points, start and end points of each independently decodable part, the relative importance of the part, etc. that can be used in determining whether to delete a given part of the packet. Deleting appropriate independently decodable parts of a packet is accomplished at 730. It is noted that deleting a part of a packet without affecting the encryption, coding or integrity of the remainder of the packet produces a smaller packet, more amenable to communication in a broadband-limited environment. If a transcoder readable header is required, 740, it is written at 750 and applied to the truncated data packet. Forwarding of the packet occurs at 760.

It is noted here that embodiments of the present invention perform the same functions in the employment and transmission of unencrypted data. The data verification functions of the cryptographic checksums remain similar whether the underlying data is encrypted or clear.

Figure 8:
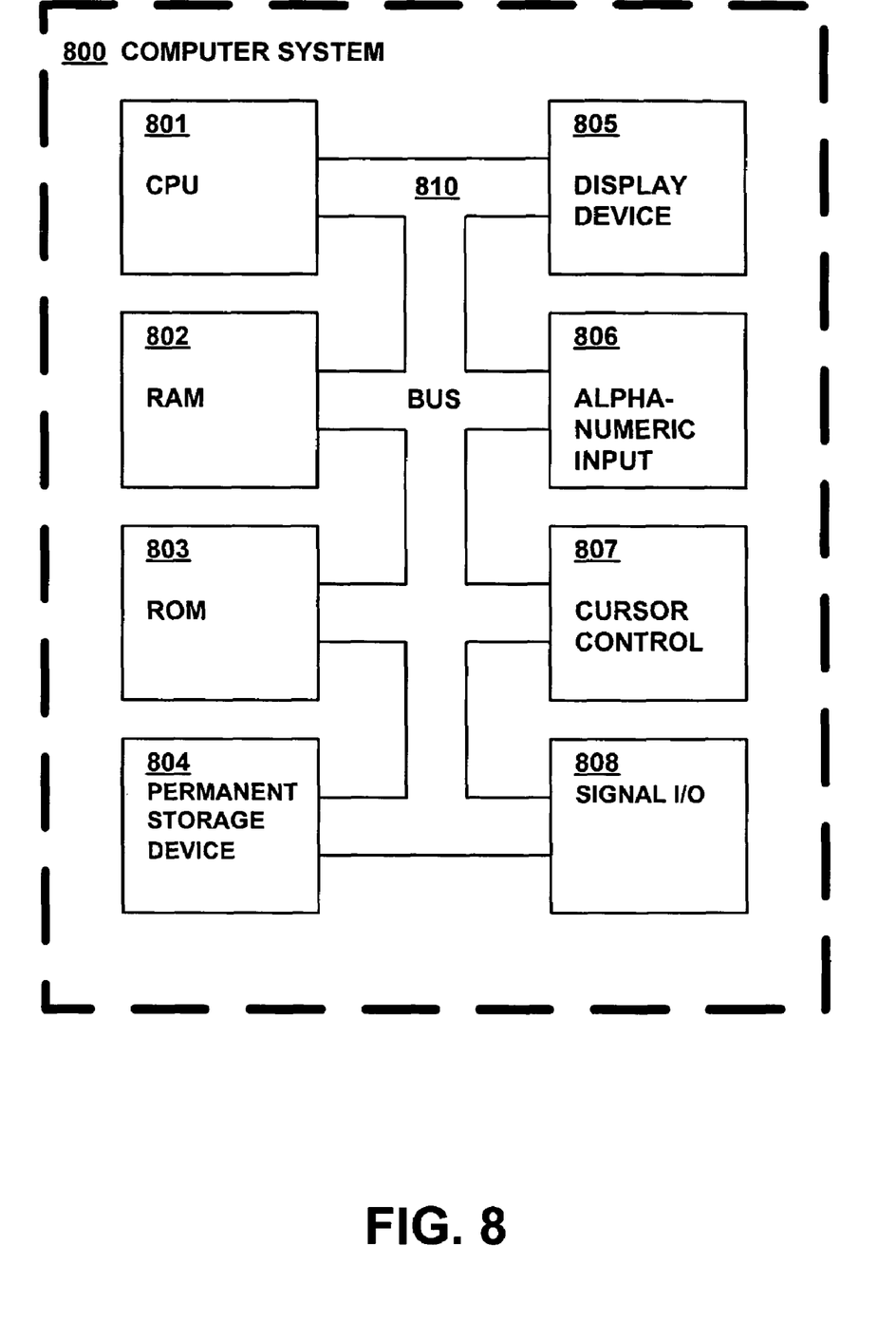
FIG. 8 illustrates an exemplary computer system in accordance with embodiments of the present invention.

Embodiments of the present invention are expected to operate in a computer system. A configuration typical to a generic computer system is illustrated, in block diagram form, in FIG. 8. Generic computer 800 is characterized by a processor 801, connected electronically by a bus 810 to a volatile memory 802, a non-volatile memory 803, possibly some form of data storage device 804 and a display device 805. It is noted that display device 805 can be implemented in different forms. While a video CRT or LCD screen is common, this embodiment can be implemented with other devices or possibly none. Bus 810 also connects a possible alpha-numeric input device 806, cursor control 807, and, importantly in the context of embodiments of the present invention involved in the transmission, transcoding and reception of streamed media, communication I/O device 808. In various implementations, communication I/O device 808 may be realized as a modem, an Ethernet connection, a wireless device, or any other means of communicating signals between a computer system and a communications network. An alpha-numeric input device 806 may be implemented as any number of possible devices, but is commonly implemented as a keyboard.

Accordingly, embodiments of the present invention provide methods and systems to enable a potentially untrusted transcoder within a network to transcode a media stream while still preserving the end-to-end security of the rest of the stream. Specifically, disclosed are methods and systems for computing and performing the cryptographic checksum such that as long as the potentially untrusted transcoder performs the transcoding in the appropriate manner, the receiver is still able to validate the integrity of the transmitted data and any encryption of the transmitted data remains uncompromised. Furthermore, embodiments of the present invention are also useful for ensuring the integrity of unencrypted modified data.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. A method for ensuring integrity of data, comprising:
   separating, utilizing a computer, an amount of data into segments comprising a plurality of truncatable units, wherein a truncatable unit is a portion of a packet payload that can be truncated from said packet payload;
   computing, utilizing said computer, a cryptographic checksum for a said segment;
   combining, utilizing said computer, a segment and an associated cryptographic checksum into a data packet; and
   applying a header to said data packet, said header comprising information regarding at least one truncation point identifying at least one said truncatable unit of said data packet.

2. The method described in claim 1 wherein said data comprises media data.

3. The method described in claim 1 wherein said data comprises secure scalably streamable data.

4. The method described in claim 1 wherein said data is transmittable in a network.

5. The method described in claim 1 wherein said data is stored in a storage medium.

6. The method described in claim 1 further comprising forwarding said data packet.

7. The method described in claim 1 wherein said data to be streamed comprises a plurality of said data packets.

8. The method described in claim 1 further comprising encrypting said segment and said cryptographic checksum.

9. The method described in claim 8 wherein said packet is enabled to be decrypted independently of other packets comprising said streamed media data.

10. The method described in claim 1 wherein said cryptographic checksum is computed for a truncatable unit in said segment.

11. The method described in claim 1 wherein a cryptographic checksum is computed for each of said truncatable units in said segment.

12. The method described in claim 1 wherein a first cryptographic checksum is calculated for a first truncatable unit, and wherein a second cryptographic checksum is calculated for the combination of a second truncatable unit, said first truncatable unit, and said first cryptographic checksum.

13. The method described in claim 1 wherein said cryptographic checksum is computed using a hash function.

14. A method for providing security to a scalably streamed media signal in a network, comprising:
    separating said streaming media signal into a plurality of truncatable units, wherein a truncatable unit is a portion of a packet payload that can be truncated from said packet payload;
    computing a cryptographic checksum for each of said truncatable units;
    appending said associated cryptographic checksum onto each of said truncatable units;
    combining one or more of said truncatable units and associated cryptographic checksums into a data packet;
    applying a transcoder-readable header to said data packet, said transcoder-readable header comprising information regarding at least one truncation point identifying at least one said truncatable unit of said data packet; and
    forwarding said data packet.

15. The method described in claim 14 wherein said transcoder-readable header is enabled to be read without decrypting encrypted parts of said data packet.

16. The method described in claim 14 wherein a cryptographic checksum is computed for each truncatable unit in said segment.

17. The method described in claim 14 wherein a first cryptographic checksum is calculated for a first truncatable unit, and wherein a second cryptographic checksum is calculated for the combination of a second truncatable unit, said first truncatable unit, and said first cryptographic checksum.

18. The method described in claim 14 wherein the size of said truncatable units is selected to ensure the size of said data packet is transmittable in said network.

19. The method described in claim 14 wherein said associated cryptographic checksum is computed independently for its associated truncatable unit.

20. The method described in claim 14 further comprising encrypting each of said truncatable units.

21. The method described in claim 14 wherein said cryptographic checksum is calculated using a hash function.

22. The method described in claim 14 further comprising:
    accessing said data packet;
    reading said transcoder-readable header of said data packet;
    deleting one or more of said truncatable units; and
    forwarding said data packet.

23. The method described in claim 22 further comprising:
    writing a new transcoder-readable header for said data packet reflecting said deleting; and
    applying said new transcoder-readable header to said data packet.

24. The method described in claim 22 wherein said transcoder-readable header is enabled to be read without decrypting encrypted parts of said data packet.

25. The method described in claim 22 wherein said deleting comprises transcoding said data packet.

26. The method described in claim 22 wherein said transcoder-readable header comprises information related to the content of said data packet while leaving said truncatable units undecrypted.

27. A computer readable medium having a data packet stored therein for causing a functional change in the operation of a device, said data packet comprising:
    a plurality of truncatable units, each of said units comprising an amount of media data, wherein a truncatable unit is a portion of a packet payload that can be truncated from said packet payload;
    a cryptographic checksum computed for each of said truncatable units; and
    a transcoder readable header comprising information regarding at least one truncation point identifying at least one said truncatable unit of said data packet.

28. The computer readable medium described in claim 27, wherein said transcoder readable header comprises information related to said cryptographic checksums.

29. The computer readable medium described in claim 28, wherein said transcoder readable header enables transcoding said data packet.

30. The computer readable medium described in claim 28, wherein said truncatable units and said cryptographic checksums are enabled to be encrypted independently of said transcoder readable header.

31. The computer readable medium described in claim 28, wherein said truncatable units and said cryptographic checksums are enabled to be decrypted independently of said transcoder readable header.

32. The computer readable medium described in claim 28, wherein said transcoder readable header is enabled to be read independently of said truncatable units and said cryptographic checksums.

33. The computer readable medium described in claim 28, wherein said transcoder readable header is enabled to be written independently of said truncatable units and said cryptographic checksums.

34. The computer readable medium described in claim 27, wherein said cryptographic checksum is computed based on one truncatable unit.

35. The computer readable medium described in claim 27, wherein said cryptographic checksum is computed based on a plurality of truncatable units and associated checksums.

36. The computer readable medium described in claim 27, wherein said cryptographic checksum is calculated using a hash function.

37. The computer readable medium described in claim 27, wherein said cryptographic checksum is calculated using a message digest function.

38. The computer readable medium described in claim 27, wherein said cryptographic checksum is calculated using a message authentication code function.

39. The computer readable medium described in claim 27, wherein said cryptographic checksum is calculated using a keyed-hashing-for-message-authentication function.

40. The computer readable medium described in claim 27, wherein said cryptographic checksum is calculated using a digital signature function.

41. The computer readable medium described in claim 27, wherein each of said truncatable units is enabled to be deleted from said transmittable packet independently of other truncatable units in said packet.

* * * * *